United States Patent [19]

Hampton et al.

[11] 3,828,933
[45] Aug. 13, 1974

[54] PLANT FOR WASTEWATER TREATMENT

[75] Inventors: Quentin L. Hampton, Ormond Beach, Fla.; Edward J. Matras, Rolling Meadows, Ill.

[73] Assignee: FMC Corporation, Chicago, Ill.

[22] Filed: Feb. 14, 1972

[21] Appl. No.: 225,984

[52] U.S. Cl................. 210/195, 210/197, 210/199, 210/220, 210/260
[51] Int. Cl............................................. C02c 1/02
[58] Field of Search......... 210/4, 5, 14, 15, 63, 195, 210/197, 220, 221, 252, 259, 6, 7, 153, 199, 232, 239, 256, 260

[56] References Cited
UNITED STATES PATENTS

| | | | |
|---|---|---|---|
| 3,694,353 | 9/1972 | Yang et al. | 210/14 X |
| 3,396,102 | 8/1968 | Forrest | 210/15 X |

*Primary Examiner*—Samih N. Zaharna
*Assistant Examiner*—Robert H. Spitzer
*Attorney, Agent, or Firm*—Max Dressler et al.

[57] ABSTRACT

A method and apparatus are provided for converting a basic unitary tank structure into a series of communicating treatment zones, through introduction of a self-supporting modular settling tank member having liquid fillable fillets as part of the structure so that the member may be anchored in position to provide watertight tank member segments which operate as cooperative treatment zones, the modular tank member providing the basic support structure for the aeration means required to convert an adjacent tank segment into an aeration zone and for support of means for effecting removal of sludge separated in the modular tank member from mixed liquor received from the aeration zone so that part of the sludge can be returned to the aeration tank and the balance discharged to any additional treatment zones and for means by which clarified effluent may be discharged from an upper portion of the modular member.

8 Claims, 7 Drawing Figures

PATENTED AUG 13 1974
3,828,933
FIG. 1
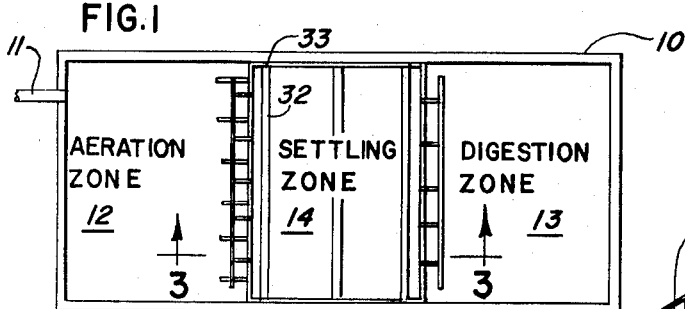
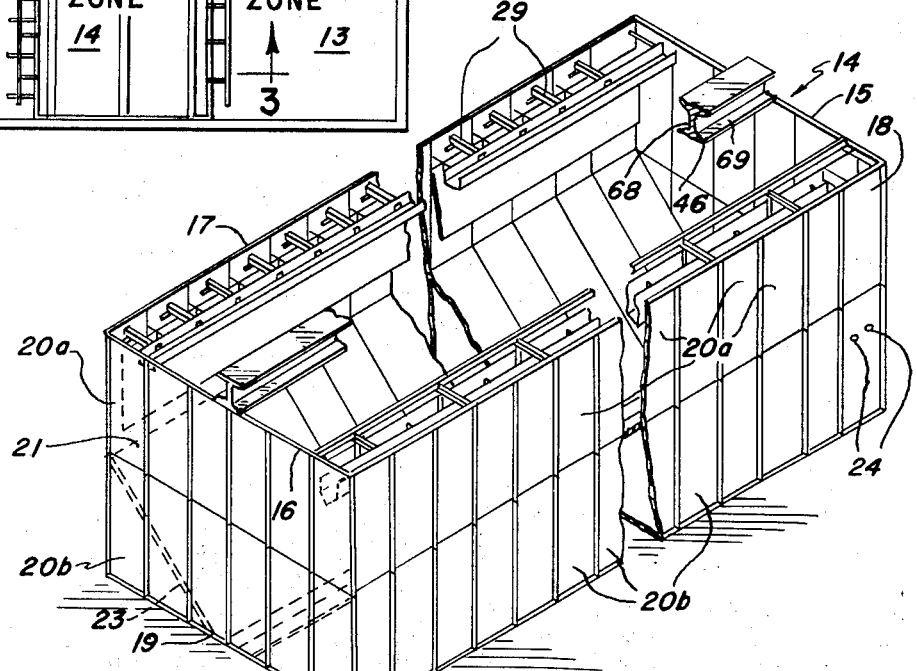
FIG. 2
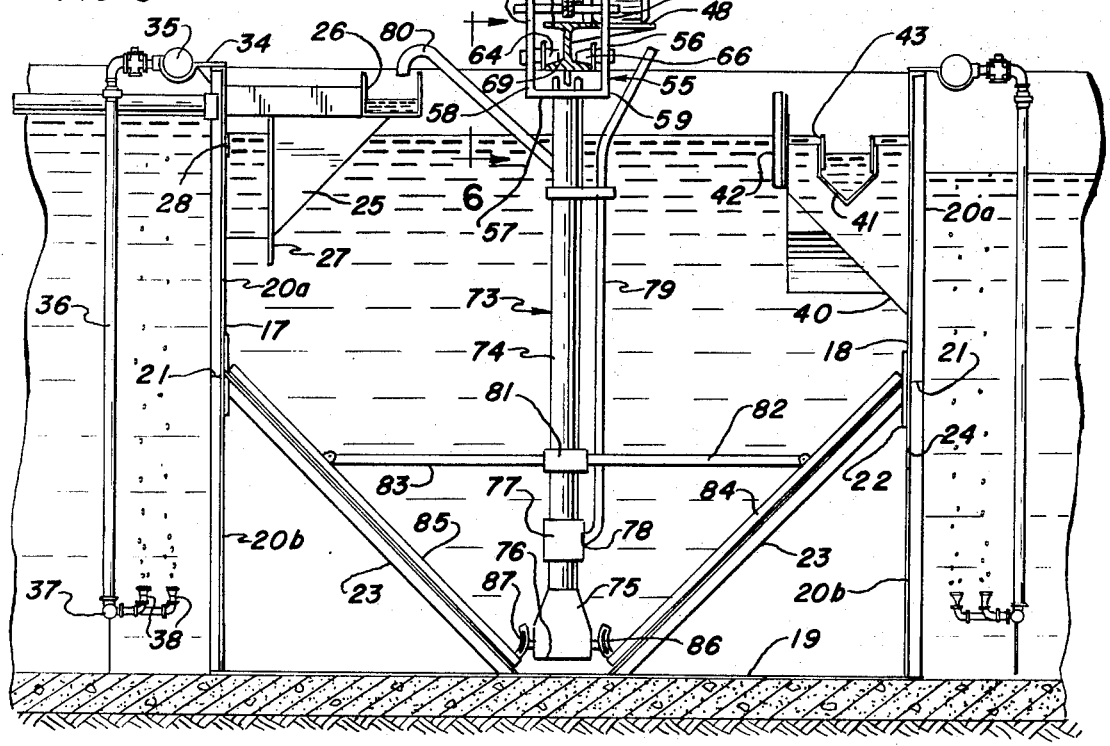
FIG. 3

PLANT FOR WASTEWATER TREATMENT

The invention relates to a plant for treatment of wastewaters. More particularly, it relates to apparatus adaptable to use as an activated sludge type system, wherein the wastewater is aerated in a first segment of a basic tank formed by insertion of a modular settling tank member into the basic tank, the aerated mixed liquor passes into the inserted modular settling tank member and a portion of the settled sludge is returned to the aeration basin and the balance of the sludge is delivered to, for example a digestion basin. Still more particularly, it relates to providing a system of the type described by anchoring in a position intermediate the ends of a preformed tank, a settling unit formed of modular parts, having liquid tight fillets, which are representative of ballast compartments formed as part of the structure and the unit being stabilizable in position by filling the fillets with flowable means.

In accordance with this invention, the method of converting a unitary liquid holding zone into a plurality of communicating cooperative treatment zones, including aeration and settling zones, for processing of wastewater, comprises positioning an insertable modular settling tank member to be anchored as a second zone taking up part of the area of said unitary holding zone, said modular tank member being assembled of prefabricated modular parts in requisite numbers to have a size completely filling a cross-sectional segment constituting only a portion of said unitary holding zone so a wall of said assembled modular tank member will provide a water tight terminal for an adjacent holding zone segment and has liquid tight hollow fillet portions as integral parts of said unit adjacent the bottom thereof, in said holding zone, introducing flowable weighting medium into said hollow fillet portions to provide the weight required to assist in anchoring said unit in a fixed position isolating portions of said unitary holding zone exterior of said settling zone unit.

Sewage treatment of the activated sludge type requires an aeration zone, a settling zone for separating the sludge as a concentrate from the mixed liquor received from the aeration zone, means for returning some of the sludge to the aeration zone and means for separately discharging sludge and clarified effluent from the system. More complete treatment may be effected by introduction of some of the concentrated sludge into, for example, additional zones for such treatments as aerobic or anaerobic digestion.

When the conventional plants for sewage treatment incorporate such a multiplicity of zones, as contiguous zones separated by wall members, the construction of such plants, regardless of whether the zones are concentric or axially aligned in a rectangular unit, is expensive because they require numerous structural members as supports to avoid wall collapse when liquid pressure is exerted inwardly or outwardly depending on which of the zones is empty at a time when the contiguous zone is filled with aqueous medium. Such structural members may also interfere with operations in the various zones.

Now it has been discovered that unitary holding zones can be converted into a series of interconnected cooperative contiguous zones, including aeration and settling zones for activated sludge type processing of wastewater by assembly of a unit for settling sludge from prefabricated modular parts to form a self supporting modular tank member, which modular tank member may be assembled within a larger tank or preassembled elsewhere for insertion as a complete unit thereinto. The modular member which comprises a self-supporting sludge settling unit which completely fills one cross-sectional segment, i.e., a limited portion of the area, of the basic tank and isolates one or more other areas for adaption to uses such as an aeration zone.

Such a modular member is adjusted in size by joining parts in requisite numbers. Since the liquid flow through a rectangular tank will generally be arranged to flow longitudinally, the modular member will generally be positioned with its longitudinal axis transverse to the longitudinal axis of the rectangular tank and have two parallel exterior vertical walls of the modular member of a length substantially equal to the internal width of said rectangular tank so that, for example, gaskets can be used at the wall ends for effecting water tight seals and rendering the zones contiguous to the walls isolated and secure against liquid leakage therefrom.

Apparatus for converting a unitary liquid holding tank into a series of interconnected cooperative zones, including aeration and settling zones, for activated sludge type processing of wastewater comprises a self supporting insertable modular settling tank member which fills only a portion of the total area of said holding tank, said modular settling tank member having downwardly and inwardly extending sloping wall members in the lower portion thereof to form an accumulation area for settled sludge at the bottom thereof and isolated liquid-tight compartments or fillets having closeable port means for inserting a weighting medium, gas dispersion means supported by and positioned adjacent the exterior of the modular tank member side wall common to an isolated second cross-sectional segment of said holding tank, liquid flow conducting means providing communication between said modular tank member and said second cross-sectional segment of said holding tank for transfer of liquid to the interior of said modular tank member and movable suspension exhaust means suspended within said modular settling tank member for withdrawing settled sludge accumulated therein, and first and second through means mounted within said modular tank member for receiving sludge and a clarified liquid respectively to be discharged from said modular settling tank member, said trough means for receiving sludge which is delivered thereto by said movable suspension exhaust means, having means for directing at least part thereof to said second cross-sectional segment of said holding tank.

More in detail, the apparatus for converting a unitary liquid holding tank into a series of interconnected cooperative zones, including aeration and settling zones, for activated sludge type processing of wastewater comprises a self supporting modular settling tank member assembled of prefabricated modular parts by joining said parts in requisite numbers to have a size such that it, for example, completely fills an area segment of said unitary holding zone spaced from an end wall thereof, for example, the longitudinal walls of said modular tank member being substantially equal to the internal width of said holding tank for effecting water tight contacts between said walls of said modular tank member and the interior of the walls of said holding tank to produce isolated zones, means for supplying influent wastewater to said holding tank area segment formed adjacent said end wall of said holding tank, said modular tank member having vertical end and first and second side walls and a bottom forming a closed tank and sloping wall members in the lower portion of said closed tank sloping downwardly and inwardly to form an accumulation area for settled sludge at the bottom thereof and isolated liquid tight hollow compartments or fillets having closeable means communicating with the interior of said compartments for inserting weighting means, liquid flow conducting means in said modular tank member sidewall common to said isolated zone for passage of liquid into said modular settling tank, between baffle means and said side wall, gas dispersion means positioned adjacent the exterior of said modular tank member sidewalls, the exterior of said modular tank member sidewalls having means for supporting said gas dispersing means, trough means positioned above the normal liquid level in said modular tank member for transfer of sludge received therein to an area outside said modular tank member, said trough means adjacent said first modular tank member sidewall common to said zone adjacent said end wall of said holding tank having means for partitioning said trough so as to split received sludge into first and second portions and for directing the first portion thereof into said zone adjacent said end wall of said holding tank, effluent trough means adjacent said second side wall spaced from said second side wall having a liquid inlet positioned at the normal liquid level of said modular tank member to conduct clarified liquid outside said unitary holding tank, support means for both said trough means secured to the interior of said side walls of said modular tank member, and said end walls of said modular member providing support bases for sludge removal means having an outlet positioned to discharge sludge into said trough means adjacent said first sidewall of said modular tank member.

The self supporting modular tank member has as a basic structure, prefabricated modular parts joined to produce vertical end and side walls consisting of single or multiple vertical modular parts and a bottom forming a closed tank. The modular tank member is provided with internal sloping walls in the lower portion of said closed tank sloping downwardly and also formed of plate type modular parts, which extend along the walls positioned transverse to the direction of liquid flow. These sloping walls are joined to said side walls and extend from a substantially horizontally extending area, of each sidewall which is elevationally spaced from the bottom of said vertical wall, to an area of said bottom spaced from the intersection of said vertical wall with the tank bottom to form a isolated liquid tight hollow compartments or fillets. A weighting medium inserted into the compartments through closeable port means communicating with the interior of said compartments displaces air through vents. When the modular tank member is positioned in a unitary tank, the compartments by being filled with a weighting medium, such as water, reduce the buoyancy of the modular tank member and provide the weight to assist in anchoring the modular tank member in a fixed position. The weighting medium in a filled compartment also provides support for the sloping walls.

The side walls of the modular tank member which are positioned transverse to the longitudinal axis of the main tank each provide a base adjacent the top thereof for a series of inwardly extending support means such as spaced gusset plates which support trough members. The trough members in turn each support a downwardly extending baffle plate running parallel to the modular tank member wall. The side wall separating the zone adjacent the end wall of the basic tank from the settling unit. i.e., a wall common to the aeration and settling zones, is provided in areas spaced between said gusset plates, with flow conducting means, such as ports, for flow of liquid medium into said modular tank member. The trough positioned along the same side wall is provided with a plurality of spaced outlet conduits which extend through the side wall into the zone adjacent the end wall of the basic tank and communicate with the interior of the trough. The trough is closed at one end and the other end has outlet means which extends through the end wall of the modular tank member. Intermediate the ends of the trough it has means for partitioning the said trough so as to split received sludge and directing part of the sludge through said tubular members into said aeration zone. The trough can be provided with an outlet pipe which will deliver sludge, e.g., discharge the excess sludge to waste or have a connection for delivery of sludge to a treatment zone, for example if so arranged, to a third segment of said basic tank, adapted to be a digestion zone, thru a channel mounted on said end wall.

Assembling of a self supporting modular settling tank unit requires, depending upon the size and character of the prefabricated modular parts used to form the unit, stiffener members which may be, for example metal plates or panel members, spinning the joint between lower and upper panels, or may be channel members extending along a peripheral wall, etc.

Secured to the top and/or outside of the vertical side wall provided with inlet ports, is means for supporting gas dispersing means. Said means, generally consist of a series of spaced steel plate supports for holding an air main in position. The air main supports depending pipe members which at their bottom end support headers for aerating wastewater received into the zone between the end wall of the base tank and the modular tank member wall adapted with inlet ports.

Sludge concentrate to be returned to the segment of the basic tank converted to an aeration zone by the air dispersers supported from the modular tank member, is introduced into the trough provided with outlet means, from the outlet pipe of sludge removal means consisting of conduit means movable lengthwise of said modular tank member with an outlet positioned to discharge sludge into said trough adjacent said first side wall.

The end walls of the modular tank member support on their top surface support means for movable sludge removal means which stretches across the modular tank member. Support means, such as a beam, provides a track on which a trolley can move back and forth. The trolley will support a movable conduit means, i.e., an exhaust pick up unit, which in each periodic cycle moves to positions adjacent various portions of the modular tank bottom so that eventually it traverses the entire area of the modular tank member bottom to remove sludge settled therein. Said sludge being removed from said modular tank member may have a portion thereof continuously discharged into the aeration zone and a portion thereof periodically intercepted for transfer, for example, to a third basic tank segment.

The invention will be further understood from the following description of embodiments of the invention taken in conjunction with the accompanying drawings, in which:

FIG. 1 is a top plan view showing a treatment plant with a modular settling tank member positioned to divide a basic tank into three segments to provide aeration, settling and digestion zones;

FIG. 2 is a perspective view of a modular settling tank;

FIG. 3 is a side elevational view along the line 3—3 of FIG. 1;

Figure 4:
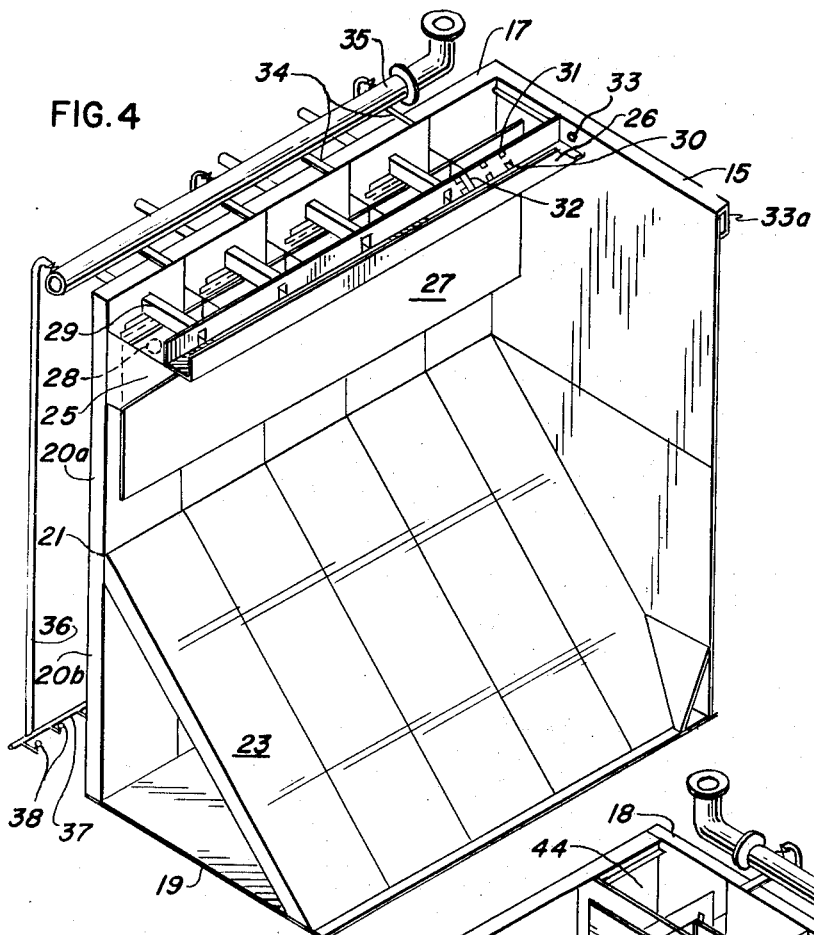
FIG. 4 is a fragmentary view of the influent side corner of the modular tank member.

Referring to FIG. 1, the numeral 10 indicates a tank of suitable material of construction such as concrete or steel. Sewage is introduced into tank 10 through an inlet 11. Tank 10 is divided into an aeration zone 12 and a digestion zone 13 by a modular settling tank member 14.

Figure 5:
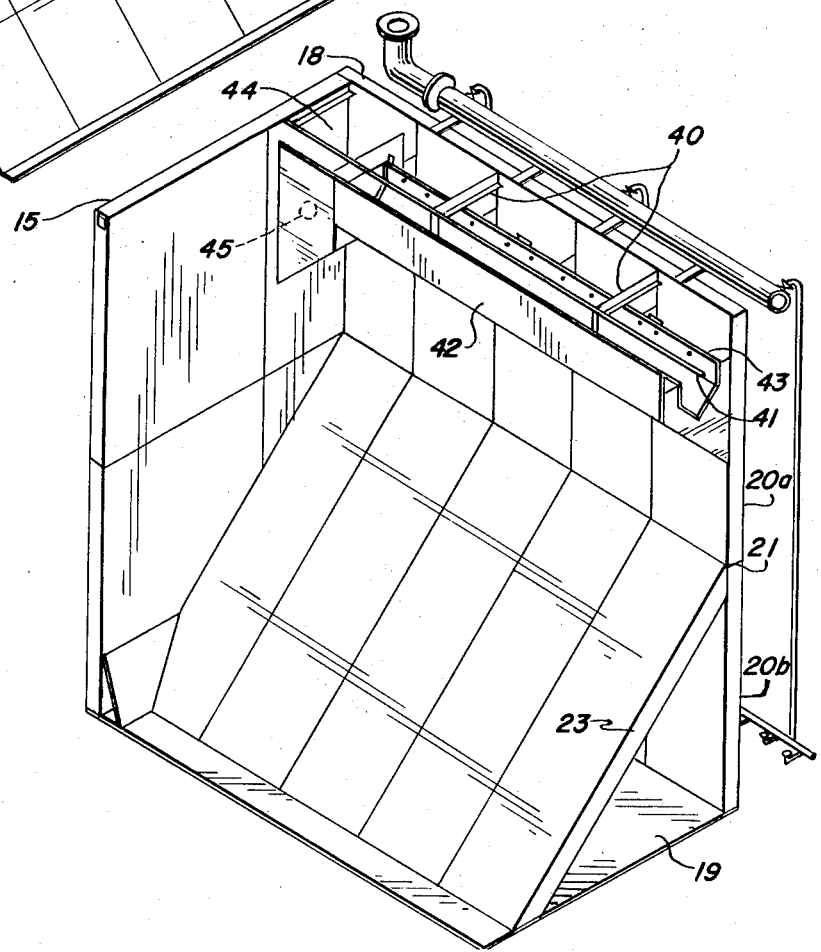
FIG. 5 is a fragmentary view of the effluent side corner of the modular tank member.
Figure 6:
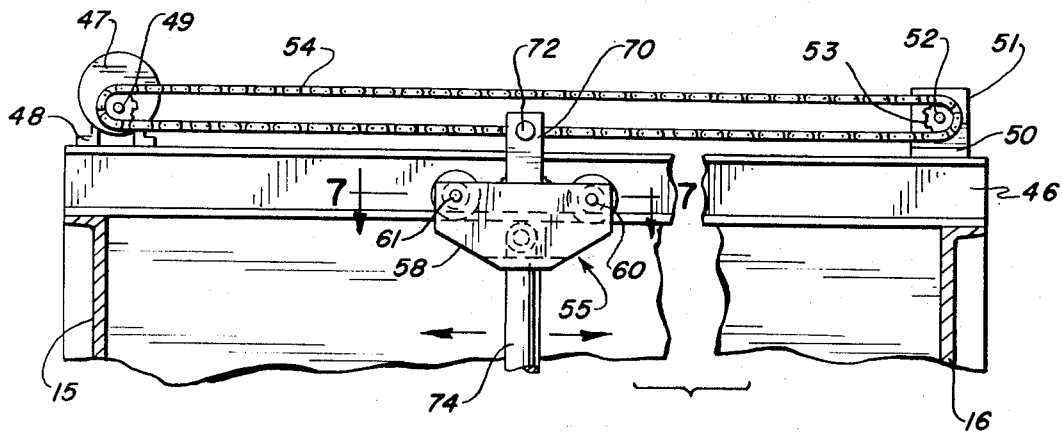
FIG. 6 is a partial view along the line 6—6 of FIG. 3.
Figure 7:
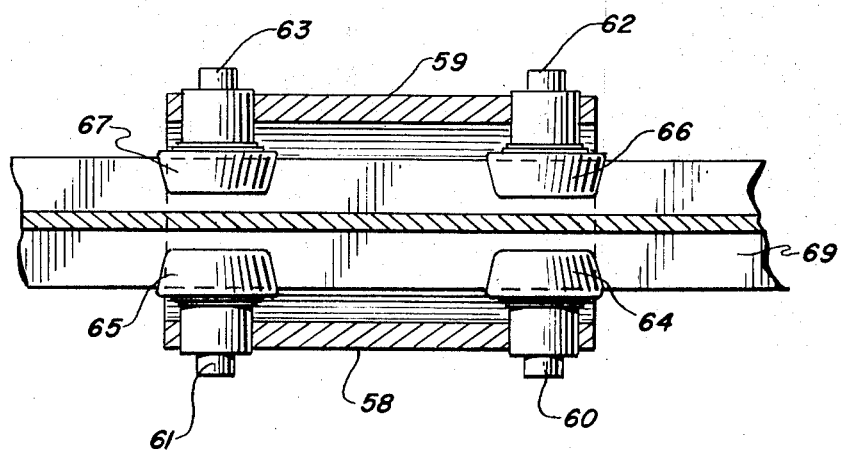
FIG. 7 is a partial top plan view of FIG. 6.

Referring to FIGS. 2 to 7, the basic structure of modular settling tank member 14 consists of vertical end walls 15 and 16 and vertical side walls 17 and 18 and a bottom 19. Each of the walls are formed of panel members 20, the number of which depending upon panel sizes. The volume of liquid to be processed will determine the number of modular panels required to give the modular tank an adequate size bolted or welded together at their adjoining edges by flanges turned outward or inward. Typical side walls 17 or 18 of two section vertical construction may be formed of an upper panel 20a and a lower panel 20b secured together by a horizontal joint 21. In the joint area a stiffener plate 22 may be secured to the wall and a sloping wall 23 may be secured to the plate. Alternatively, the sloping plate 23 may be provided with a flange which may be secured in said joint 21. The panels of sloping wall 23 are also secured at their lower end to tank bottom 19 by suitable means such as direct welding or attachment thru a flange. The fillet formed by vertical walls 17 and 18, bottom 19, and sloping walls 23 receive flowable medium thru ports 24.

Adjacent the top of wall 17 are mounted spaced gusset plates 25. Gusset plates 25 support a sludge return trough 26. Spaced from wall 17, is an influent baffle 27, which may be supported as shown by gusset plates 25, or in a position depending from said sludge return trough 26. Influent baffle 27 directs liquid flow moving into modular tank member 14 through ports 28 positioned between gusset plates 25 downwardly to assist in settling the sludge content.

Sludge return trough 26 is adapted with spaced outlet pipes 29 which deliver sludge to aeration zone, tank segment 12. Trough 26 is also provided with trough section isolating means 30 for segregating part of the sludge received in the trough which could be directed to waste, consisting of, for example, of spaced slot adjustment lugs 31 adapted to hold an adjustable gate 32 in a vertical position. Sludge discharged into the trough on one side of the gate flows from the tank through outlet 33 to a conduit 33a. On the exterior of wall 17 adjacent the top thereof, are mounted steel plate supports 34. Plates 34 support, in a substantially horizontal position, an air main 35 which communicates wth a source of air under pressure, not shown.

Air main 35 supports hanger pipes 36 whose lower end is secured to an air header 37. A plurality of gas dispersers 38 are secured to the header 37. Such an arrangement for gas dispersion means being conventional, details thereof are not described.

Adjacent the top of wall 18 are mounted spaced gusset plates 40. Plates 40 support an effluent trough 41. Plates 40 also have secured to their outer edge a baffle plate 42 which extends to an elevation above the inlet level for liquid into said trough 41 to prevent scum floating at the surface of the liquid in tank 14 from entering the trough by overflowing weir 43. Trough 41 is closed at one end and communicates at the other end with an effluent box 44 which box is provided with an outlet 45.

On the exterior of wall 18, adjacent the top thereof, if wall 18 is to be common to settling zone 14 and a digestion zone 13, is mounted gas dispersion means similar to that described as mounted on wall 17.

End walls 15 and 16 support a beam member 46. A source of power such as an electric gear motor unit 47 is mounted on a bracket 48 secured to beam member 46 at the end adjacent wall 15. Gear motor unit 47 is the source of power for actuation of a sprocket wheel 49. Beam member 46 at the end adjacent wall 16 has mounted thereon a bracket 50. Bracket 50 supports a bearing assembly 51 in which is journaled a shaft 52. Shaft 52 supports an idler sprocket wheel 53. An endless chain 54 is trained over the sprocket wheels 49 and 53 and has the ends thereof pivotably connected to a pin supported by a trolley 55. Electric gear motor 47 which drives chain 54, may be of the reversing type whose rotation in each direction generally is controlled by limit switches.

Trolley 55 includes a frame 56 of a U-shaped cross section having a bottom 57 which is disposed beneath the beam member 46 and sides 58 and 59 which straddle and are spaced from said beam member. Side 58 of trolley 55 has inwardly extending axles 60 and 61 and side 59 has inwardly extending axles 62 and 63, respectively, journaled adjacent each end thereof. Axles 60, 61, 62, and 63 support flanged wheels 64, 65, 66, and 67, respectively. The flanged wheels straddle the web 68 of beam member 46 and rest upon the bottom flange 69 thereof. Thus, the trolley is supported for free travel on flange 69 back and forth above the open top of modular member 14. Sides 58 and 59 of trolley 55 are provided with ears 70 and 71 which extend above the top of the beam means 46. Ears 70 and 71 are adapted to support pin 72 to which the ends of chain 54 are secured, in a position above the beam member 46.

A pump 73 of a conventional air lift type is supported by trolley 55 in a position suspended below the beam member 46. The elongated conduit 74 has a suction bell 75 at the lower end thereof positioned adjacent the bottom 19 of the modular member 14. Suction bell 75 is of such a size that it extends nearly across the flat portion of floor 19 to adjacent the bottom of sloping walls 23. The suction bell 75 has an inlet port 76 in the form of a slot in the bottom thereof.

Intermediate its ends, the conduit 74 is provided with a coupling 77. A port 78 extends through the coupling 77 and communicates with the interior of conduit 74. An air conductor 79 leads upwardly from the coupling 77 and connects with a conventional source of compressed air not shown which can be positioned externally of the tank 10 for supplying the air for operating the pump 73 to create a suction. The conduit 74 includes an outlet branch 80 which is illustratd as discharging directly into the trough 26.

Conduit 74 is provided with a collar 81 from which arms 82 and 83 extend substantially horizontally. Pivotally connected to the extremeties of arms 82 and 83 are scraper members 84 and 85. Scraper members 84 and 85, respectively, are held in a position parallel to and spaced from sloping walls 23 by slotted brackets 86 and 87 adapted to adjust the angularity of the scraper members 84 and 85, which slotted brackets are secured to suction bell 75.

When this traveling air lift is adapted to travel at a rate of 2 feet per minute in a settling tank having a trough 24 feet in length, sludge accumulating on any square foot of the horizontal floor between said sloping walls 23 will be removed once in each 12 minute period.

When an influent volume of sewage to be treated using the type of equipment illustrated in the FIGS. 1 through 5, is 100,000 gallons per day containing 167 lbs. of BOD per day and the flow is to be limited to an effluent overflow rate of 500 gallons per square foot per day of final tank surface, and if the aeration tank loading is to be limited to 35 lbs. of BOD per 1,000 cubic foot, a holding tank of approximately 42.5 foot length, 21 foot width and 11 foot depth can be utilized as the basic tank to be converted into interconnected cooperative zone segments. To effect such conversion, a modular tank unit of 21 foot length, 9.5 foot width and 11 foot depth may be anchored in a position to provide a first tank segment convertible to an aeration zone of 21 foot length, 20 foot width and 11 foot depth and a third tank segment, convertible to a digestion zone of 21 foot length, 13 foot width and 11 foot depth.

When sewage enters the aeration zone at a rate of 100,000 gallons per day, carrying 167 lbs. of BOD per day, air required for BOD removal will be 8.2 cubic feet per minute per foot of aeration zone length and may be introduced by 24 dispersers suspended adjacent tank wall 17.

Mixed liquor flows into the modular settling tank member from the aeration tank segment through about 7 ports of approximately 4 inches by 12 inches dimension and flows downwardly through the area between the inlet baffle and ports at a velocity of not to exceed about 0.065 feet per second.

Effluent separated in the modular settling tank member overflows V notch weirs into the effluent trough and is discharged at a rate of approximately 100,000 gallons per day through a grouting box communicating with an effluent pipe. The sludge removal means cycles, i.e., travels back and forth over the length of the modular tank member. Sludge is removed from adjacent the bottom of the modular tank member at a rate of approximately 70 gallons per minute. Approximately 680 gallons of sludge will be discharged to the aeration zone and approximately 20 gallons of sludge per cycle of ten minutes may be discharged through outlet 33 and conduit 33a to digestion zone 13.

In the digestion zone 13, at an air requirement for aerobic digestion of the sludge of approximately 1 cubic feet per minute per pound of volatile suspended solids added per day, the required amount of air would be approximately 80 cfm. which may be introduced through air dispersers supported by the wall 18 of said modular tank member 14.

Residual solids accumulated in a digestion zone 13 are periodically discharged through an insertable pipe means connected to, for example, a suction pump.

The above-detailed description has been given by way of illustration without any intention that the invention be limited to the exact conditions set forth. No unnecessary limitations should be understood therefrom, as modifications will be obvious to those skilled in the art.

We claim:

1. Apparatus for converting a unitary liquid holding tank into a series of interconnected cooperative zones, including aeration and settling zones, for activated sludge type processing of wastewater comprising a self supporting insertable modular settling tank member filling only a portion of the total area of said holding tank, said modular settling tank member having downwardly and inwardly extending sloping wall members in the lower portion thereof to form an accumulation area for settled sludge at the bottom thereof and isolated liquid tight hollow compartments having closeable port means communicating with the interior of said compartments, gas dispersion means supported by and positioned adjacent the exterior of the modular tank member side wall common to an isolated second cross-sectional segment of said holding tank, liquid flow conducting means providing communication between said modular tank member and said second cross-sectional section of said holding tank for transfer of liquid to the interior of said modular tank member and movable suspension exhaust means suspended within said modular settling tank member for withdrawing settled sludge accumulated therein, and first and second trough means mounted within said modular tank member for receiving sludge and a clarified liquid respectively to be discharged from said modular settling tank member, said trough means for receiving sludge which is delivered thereto by said movable suspension exhaust means, directing at least a part thereof to said second cross-sectional segment of said holding tank.

2. Apparatus according to claim 1 wherein said first trough means supported by said sidewall of said modular settling tank member common to an isolated second cross-sectional segment of said holding tank is adapted with a plurality of spaced outlet conduits for distribution of sludge into said zone adjacent said end wall of said holding tank and with means for partitioning the received sludge and directing the remainder of said sludge received by periodic interception of sludge discharging from said movable conduit means to said zone adjacent said end wall of said holding zone or to another sludge receiving zone.

3. Apparatus according to claim 2 wherein said means communicating with both of said sludge receiving zones is channel means extending along the end wall of said modular settling tank member, and said channel means is connected to said end wall to act as a stiffener thereof.

4. Apparatus according to claim 1 wherein said movable suspension exhaust means consists of conduit means movable along the flat portion of the bottom of said modular member between said sloping walls, with its inlet adjacent the bottom and an outlet positioned to discharge into said first trough means mounted on said wall common to said zone adjacent said end wall of said holding tank.

5. Apparatus according to claim 1 wherein said modular settling tank member fills a central area of said holding tank and isolates a tank segment adjacent to each end wall of said holding tank and said modular tank member supports in a position exterior to the wall common to each of said isolated tank segments, aeration means consisting of a horizontally positioned air main, depending hanger pipes, headers connected to said hanger pipes, gas dispersers supported by their connection to said headers and said first trough means having means communicating with both of said isolated tank segments adjacent end walls.

6. Apparatus for converting a unitary liquid holding tank into a series of interconnected cooperative zones, including aeration and settling zones, for activated sludge type processing of wastewater comprising a self supporting modular settling tank member assembled of prefabricated modular parts by joining said parts in requisite numbers to have a size such that said modular tank member completely fills an area segment of said unitary holding zone spaced from an end wall thereof, the longitudinal walls of said modular tank member being substantially equal to the internal width of said holding tank for effecting water tight contacts between said walls of said modular tank member and the interior of the walls of said holding tank to produce isolated zones, said modular tank member having vertical end and first and second side walls and a bottom forming a closed tank and sloping wall members in the lower portion of said closed tank sloping downwardly and inwardly to form an accumulation area for settled sludge at the bottom thereof and isolated liquid tight hollow compartments having closeable port means communicating with the interior of said compartments, means for supplying influent wastewater to said holding tank area segment formed adjacent said end wall of said holding tank, liquid flow conducting means in said first modular tank member sidewall common to said holding tank area segment, and baffle means adjacent the exterior of said sidewall, for passage of liquid into said modular settling tank, between said baffle means and said sidewall, gas dispersion means positioned adjacent the exterior of said first modular tank member sidewall, the exterior of said modular tank member sidewall having means for supporting said gas dispersing means, trough means positioned above the normal liquid level in said modular tank member for transfer of sludge received therein to an area outside first modular tank member sidewall common to said holding tank area segment adjacent said end wall of said holding tank, said trough having partitioning means so as to split received sludge into first and second portions and so as to direct the first portion thereof into said holding tank area segment adjacent said end wall of said holding tank, effluent trough means adjacent said second sidewall and spaced from said second sidewall, having a liquid inlet positioned at the normal liquid level of said modular tank member to conduct clarified liquid outside said unitary holding tank, support means for both of said trough means secured to the interior of said sidewalls of said modular tank member, and sludge removal means supported by said end walls of said modular member, said sludge removal means having an outlet positioned to discharge sludge into said trough adjacent first sidewall of said modular tank member.

7. The method of converting a unitary liquid holding zone into a plurality of communicating cooperative zones, including aeration and settling zones, for processing of wastewater which comprises the steps of positioning in said holding zone an insertable modular settling zone unit of a size completely filling a cross-sectional segment constituting only a portion of said unitary holding zone, and having gas dispersion means supported in position exterior of said unit by the longitudinal external surfaces thereof, and having isolated liquid tight hollow compartments as integral parts of said unit adjacent the bottom thereof and introducing flowable weighting medium into said hollow compartments to provide the weight required to assist in anchoring said unit in a fixed position, thus isolating portions of said unitary holding zone exterior of said settling zone unit.

8. A method according to claim 7 wherein liquid communication means is provided between said settling zone unit and an isolated portion of said holding adapted to be a wastewater aeration zone and an isolated portion of said holding zone adapted to be a sludge digestion zone and sludge removed from said settling zone unit is delivered to said isolated portions of said holding zone and air is introduced into said isolated portions by gas dispersion effected from apparatus supported from and mounted adjacent the exterior sides of said insertable modular settling unit common to each said isolated portions of said holding zone.

* * * * *